Aug. 5, 1924.

C. L. WACHTER 1,503,730

DIRIGIBLE BALLOON CONTROL FOR LANDING

Filed Sept. 18, 1922    2 Sheets-Sheet 1

INVENTOR.
Charles Lucas Wachter
BY
Gifford, Bull & Scull
his ATTORNEYS.

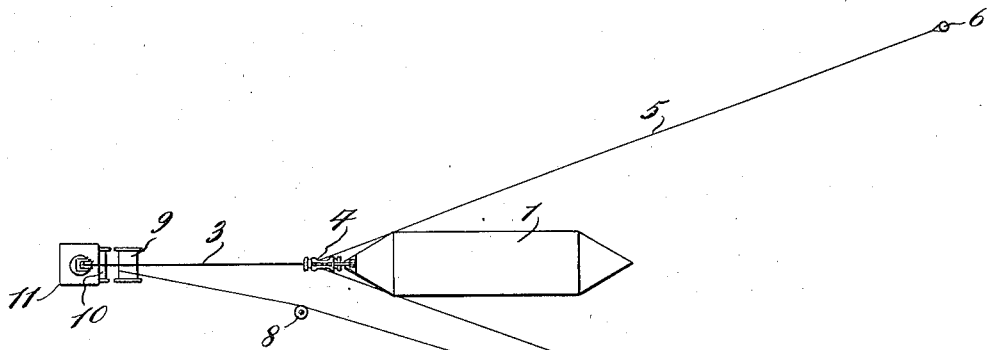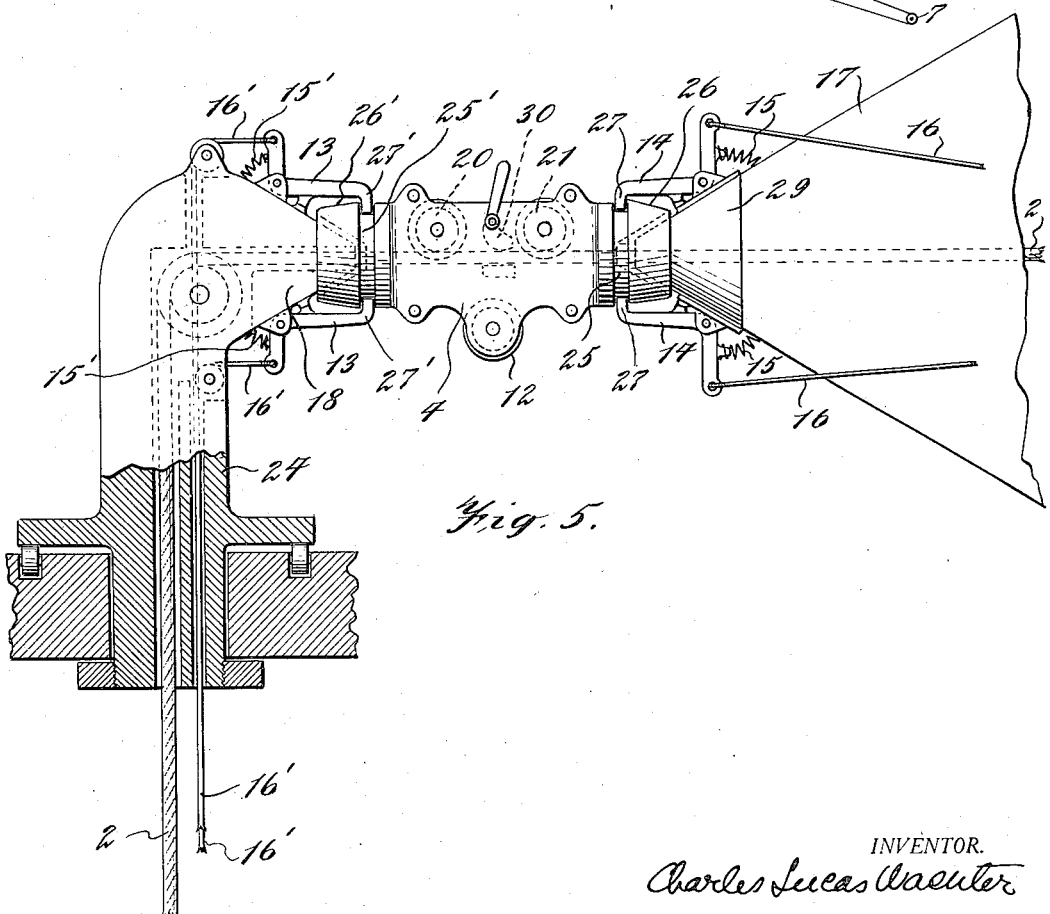

Patented Aug. 5, 1924.

1,503,730

UNITED STATES PATENT OFFICE.

CHARLES L. WACHTER, OF NEW YORK, N. Y., ASSIGNOR TO LIDGERWOOD MANUFACTURING COMPANY, OF NEW YORK, N. Y., A CORPORATION OF NEW YORK.

DIRIGIBLE-BALLOON CONTROL FOR LANDING.

Application filed September 18, 1922. Serial No. 588,742.

*To all whom it may concern:*

Be it known that I, CHARLES LUCAS WACHTER, a citizen of the United States, and a resident of New York city, in the county of New York and State of New York, have invented certain new and useful Improvements in Dirigible-Balloon Controls for Landing, of which the following is a specification.

My invention particularly relates to dirigible balloon controls for landing.

Heretofore in the operation of landing, it has been customary practice for the airship to approach the mooring station against the wind and when the ship is within, say a thousand feet of the station, to lower a line which is joined to a towing cable leading from the landing tower. Then two or more lines, known as side, backhaul or yarding lines, are dropped and these are carried out to snatch blocks off to either side and then over toward the tower to as many small winches electrically operated.

This system requires a considerable gang of men and takes three operators at the hoists, and furthermore considerable team work is required on the part of the men to prevent any accident or undue strain on the ship.

It is an object of my present invention to provide a system of control wherein a single line is dropped from the ship and in which a single backhaul cable is required.

It is a further object of my invention to provide an improved means for securing the ship to the tower after it has been hauled in.

Other objects and advantages of my invention will be apparent hereinafter and more particularly referred to.

Figure 1:
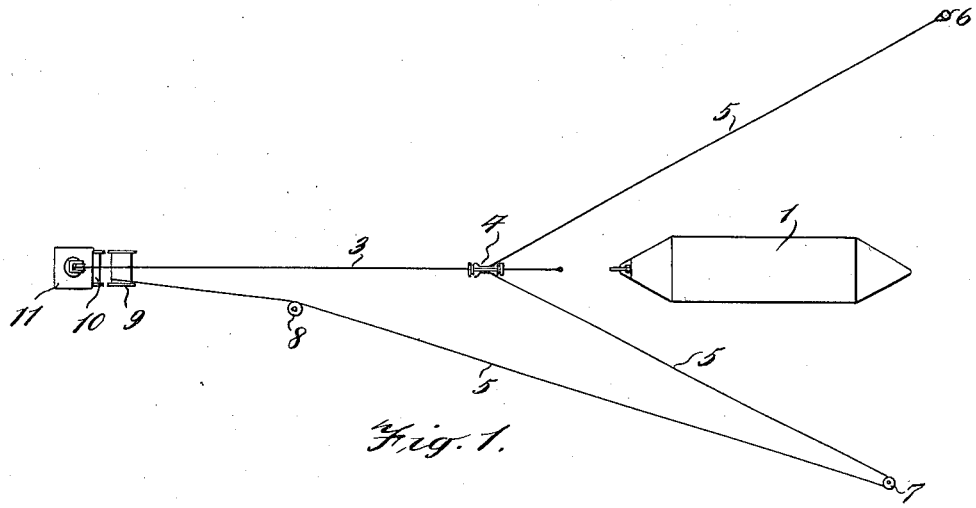
Figure 2:
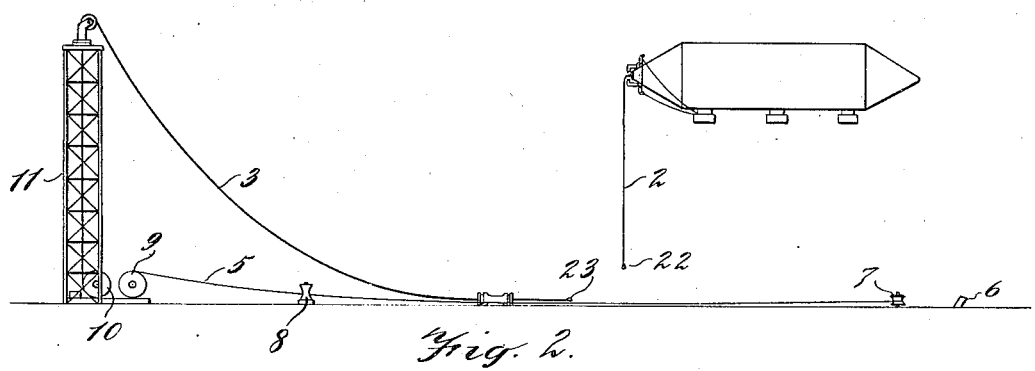
Figure 3:
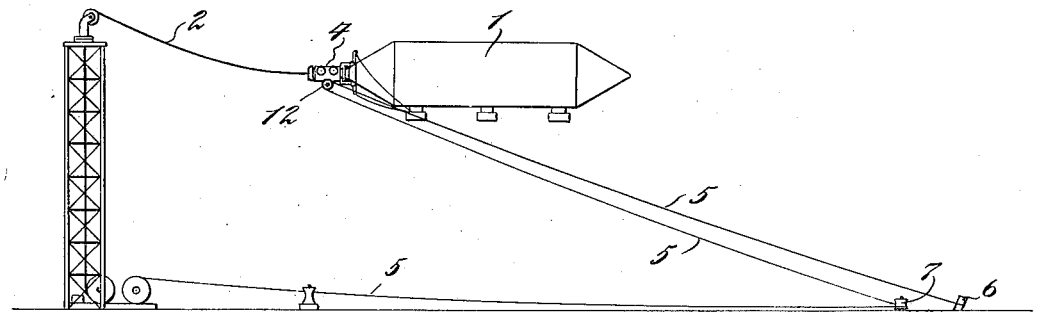

The invention is illustrated in the accompanying drawings, in which Figs. 1, 2, 3 and 4 are diagrammatic representations of the carrying out my improved system of dirigible control, and Fig. 5 is a detail view in elevation of my improved means for securing the ship to the tower after it has been towed in and for holding the backhaul line in operative connection to the ship.

In the operation of my invention, the airship 1 upon reaching a convenient distance from the tower and having approached it against the wind, drops a line 2 which reeves out through a passage located centrally of the ship and is joined at 22 and 23, to the towing cable 3 paid out from the mooring tower 11. Previously the backhaul cable 5 has been laid out by anchoring one end of it to the ground or any other relatively stationary object to rearward of the ship as at 6, and passing it through a pulley, shown at 12 in Fig. 5, in the carriage 4. From there it leads back to a snatch block 7 preferably also in the rear of the ship and from there it is conveniently laid over guiding pulley 8 to the winch 9.

The carriage 4 is preferably adapted to be carried by a cable 3 by means of the pulleys 20 and 21 in the interior of the carriage. The cable 3 is now drawn in by means of the drum hoists 10, whereupon it will be seen that as the slack in backhaul cable 5 is taken up (the winch 9 either remaining stationary or pulling in cable 5) the carriage 4 carrying backhaul cable 5 will ride up cables 3 and 2 due to the resultant of the forces exerted by cables 3 and 5 until it touches the nose of the ship. Here it is secured by a locking mechanism which will now particularly be described.

Secured to the nose of the ship 17 is the shield 29 and to this are fastened bell-crank levers 14. The latter terminate in fingers 27 which are adapted to enter the slot 25 of the carriage 4. It will now be seen that as the carriage 4 comes into register with the nose of the ship the fingers 13 ride up the inclined surface 26 of the carriage and actuated by springs 15 enter the slots 25 thereby locking the carriage to ship. The carriage is released by operation of cables 16.

The positions of the anchoring posts 6 and snatch block 7 having been appropriately chosen rearward and to either side of the ship, it will be seen that by maintaining the proper tension in the cable 5, by means of winch 9 all tendency of the ship either to override or sway unduly, owing to a sudden shift of the wind, is effectually prevented.

The carriage now having been attached to the ship the latter may be secured to the tower, in any appropriate way, but preferably by my improved mechanism shown in Fig. 5. This device shown in Fig. 5 consists of the bell-crank levers 13 attached to the nose 18 of the rotatable turret 24 and controlled by cables 16'. The bell-cranks 13 terminate in fingers 27' which are adapted to enter the slot 25' of the carriage 4 and as the ship bearing the carriage 4 comes into position, these fingers ride up the inclined face 26' of the forward portion of the carriage 4 and enter the slot 25', being actuated by springs 15'.

This system also permits easy disposition of the backhaul lines and carriage when the ship has left the moorage. Preparatory to departure the cable 2 is hauled back into the ship and detached from the cable 3 leading from the tower. The loose end of 3 is now secured to the carriage by means of the clamp 30. The ship having been released from the carriage the latter is released from the tower by operation of cable 16', whereupon it descends due to the paying out of cable 3. Backhaul cable 5 may at the same time be hauled in, so that if desired the carriage will come to rest in approximately its initial position on the ground.

An important advantage of my invention is that a uniform tension on the backhaul system is at all times maintained because of the slidable connection of the cable 5 to the ship. This advantage will be more evident when my system is compared with the prior art in which separate backhaul lines rigidly attached to the ship are employed. In such a case if one line is let out (or pulled in) faster than the rest (which may easily happen) an excessive strain is set up in one or the other backhaul lines which will result in detriment to the cables and may result in bringing down the ship. In my system this cannot happen since but one winch is used to operate the backhaul system.

It will thus be seen that I have provided a simple and inexpensive system of dirigible control and moorage which requires the attention of only two men on the ground. It is also apparent that an important object of my invention is attained without the use of my specific anchoring mechanism, as it is obvious that the pulley bearing the backhaul line may be secured to the ship in any desired manner and any other specific anchoring device may be used when the ship has been towed in.

What I claim and desire to secure by Letters Patent of the United States is:

1. A mooring system for air ships, comprising in combination, a moorage, a towing cable connected thereto, means for connecting said cable to the air ship, operating means for said towing cable, a pulley carried by said ship, a back haul cable adapted to ride over said pulley, anchoring means for said back haul cable and means to vary the length of said back haul cable.

2. A mooring system for air ships, comprising in combination, a moorage, a towing cable connected thereto, means for connecting said cable to the air ship, operating means for said towing cable, a pulley carried by said ship, a back haul cable adapted to ride over said pulley, anchoring means located rearward of the nose of said ship, when the latter is pointing toward the tower for said back haul cable and means to vary the length of said back haul cable whereby the tension therein is opposed to undue forward or lateral motion of said air ship.

3. A mooring system for air ships, comprising in combination, a moorage, a towing cable connected thereto, means for connecting said cable to the air ship, operating means for said towing cable, a carriage adapted for connection to said ship, means for slidably supporting said carriage on said towing cable, a pulley carried by said carriage, a back haul cable adapted to ride over said pulley, means to anchor said back haul cable and means to vary the tension of said back haul cable.

4. In a mooring system for air ships, comprising a turret, in combination, a carriage, means to fasten said carriage to the air ship means to fasten said carriage to said turret and means associated with said carriage for bringing said carriage into operative connection with said ship.

5. A mooring system for air ships comprising in combination, a mooring turret, a towing cable connected thereto, means for connecting said cable to the air ship, operating means for said towing cable, a carriage adapted for connection to said ship and turret, means for slidably supporting said carriage on said towing cable, a pulley carried by said carriage, a back haul cable adapted to ride over said pulley means to anchor said back haul cable, means to vary the tension of said back haul cable, means to secure said carriage to said ship and means to secure said carriage to said turret.

6. A mooring system for airships comprising a moorage, a towing cable connected with said moorage, a back haul cable, means for picking up a back haul cable and securing it in slidable connection with the ship, means for anchoring the back haul cable and means for varying the length of the back haul cable.

7. A mooring system for airships comprising a moorage, a towing cable connected with said moorage, a back haul cable, means for picking up and securing said said back haul cable in slidable connection with the ship, anchoring means at laterally separated points to the rearward of the nose of the ship, when the latter is pointing toward the tower, and means for varying the length of said back haul cable whereby the tension therein is opposed to lateral or undue forward motion of the ship.

8. A mooring system for air ships, comprising in combination, a moorage a towing cable connected thereto, means for connecting said cable to the air ship, operating means for said towing cable, a pulley adapted for connection to said ship, a back haul cable adapted to ride over said pulley when connected to said ship, anchoring means to rearward of said ship when the latter is pointing toward the tower, for anchoring said ship, comprising means to secure one end of the cable and a pulley laterally disposed of said securing means and in operative connection with said cable, and means to vary the length of said back haul cable, whereby the tension therein is opposed to undue forward or lateral motion of said air ship.

9. A mooring system for air ships, comprising a moorage, a towing cable for connecting the ship to the moorage, a cable anchored at two points distant from said moorage, a means for holding said second cable in slidable attachment to the ship at a point intermediate the points of anchorage and the moorage, and means for varying the length of said second cable whereby an unequal tension in the parts of said second cable to either side of the ship is prevented.

10. In a mooring system for air ships, comprising a turret, in combination, a carriage, a cable, means on said carriage for slidably supporting said carriage on said cable, means on said carriage operable for non-slidably securing said cable to said carriage, means to fasten said carriage to the air ship, means to fasten said carriage to said turret and means associated with said carriage for bringing said carriage into operative connection with said ship.

11. A mooring system for airships comprising a moorage, a towing cable connecting said moorage and the airship, operating means for said towing cable, a single back haul cable held in slidable attachment to said ship, anchoring means at laterally separated points for said back haul cable and means to vary the length of said back haul cable.

CHARLES L. WACHTER.